May 5, 1936.　　　M. STÖPPEL　　　2,040,017
APPARATUS FOR CUTTING FOODS AND THE LIKE
Filed March 15, 1934　　2 Sheets-Sheet 1
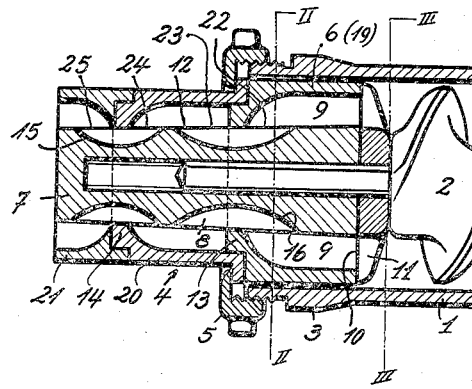
Fig.1
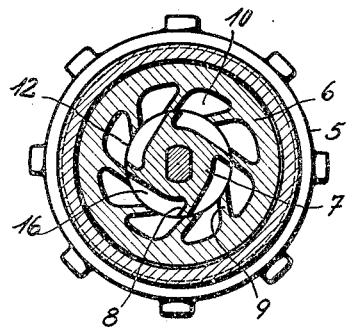
Fig.2
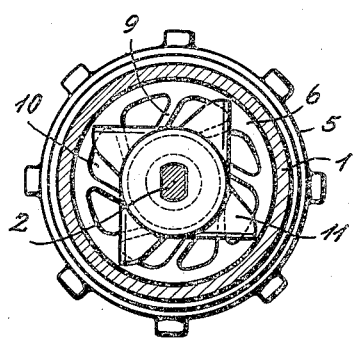
Fig.3
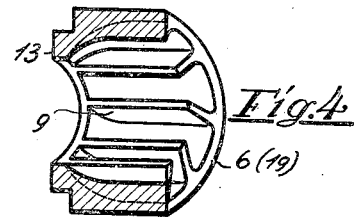
Fig.4
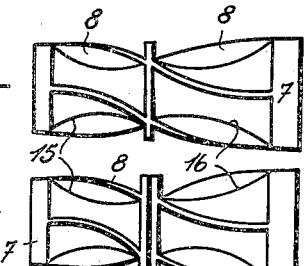
Fig.5
Fig.6
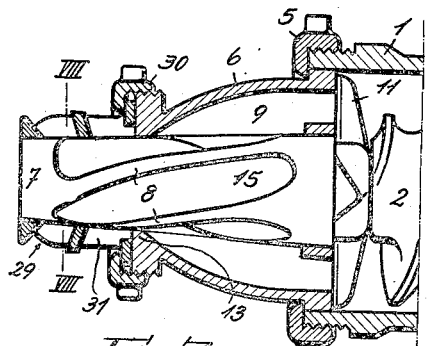
Fig.7
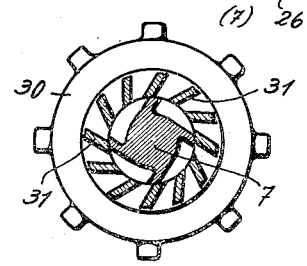
Fig.8
Inventor:
MAXIMILIAN STÖPPEL
By Norris & Bateman
ATTORNEYS May 5, 1936.  M. STÖPPEL  2,040,017
APPARATUS FOR CUTTING FOODS AND THE LIKE
Filed March 15, 1934  2 Sheets-Sheet 2
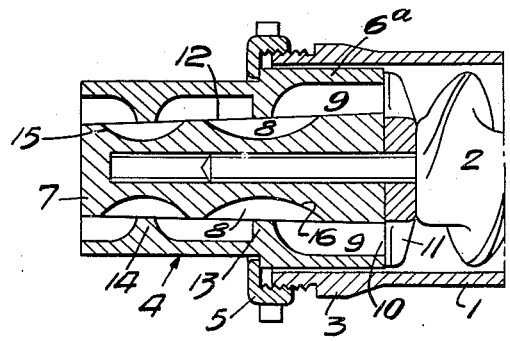
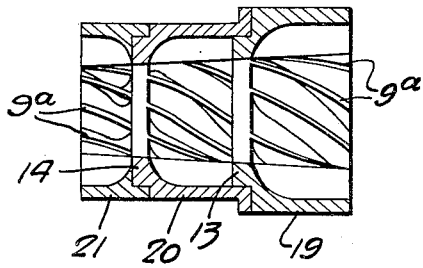
Inventor
MAXIMILIAN STOPPEL
By Norris + Bateman
Attorneys Patented May 5, 1936

2,040,017

UNITED STATES PATENT OFFICE 2,040,017

APPARATUS FOR CUTTING FOODS AND THE LIKE

Maximilian Stöppel, Lippstadt, Germany, assignor to Josef Scholtes, Dusseldorf, Germany Application March 15, 1934, Serial No. 715,729
In Germany March 21, 1933

15 Claims. (Cl. 146—184)

Various methods of cutting food and apparatus for carrying out such methods are known. Such previously used apparatus are chiefly characterized by the use of perforated discs or the like. The material to be cut is pressed through the perforated discs by means of a worm and is comminuted transversely by means of a knife which is arranged in front of the perforated disc and is connected with the conveyer worm. Also, meat mincing machines are known in which the worm member at the same time forms the cutting member. In such an arrangement the cutting members are formed by groove-like recesses in the housing and in the worm member.

The apparatus described above are disadvantageous in many respects for the handling of meat, particularly as the meat to be cut is subjected to a constant considerable compressive force, which may reduce its quality to such an extent that it is no longer suitable for making goods intended to be kept for any extended period and for goods of high quality.

The object of the present invention is to provide an apparatus for cutting food and the like in which the goods to be cut are passed in undulatory manner past cutting surfaces disposed in the direction of movement of the goods, so that the latter are cut without pressure. The apparatus for carrying out the invention comprises a sleeve cutter and an axial knife which co-operate with each other. In this arrangement the axial knife is coupled with the conveyer worm of the machine and is turned thereby.

The mode of operation of the improved apparatus is explained in the following description and illustrated by the accompanying drawings. The drawings show various forms of construction of the apparatus:

Fig. 1 showing a longitudinal section through the apparatus;

Fig. 1a is a view similar to Fig. 1 but showing another embodiment of the invention;

Fig. 2 showing a cross-section along the line II—II of Fig. 1;

Fig. 3 showing a similar section along the line III—III of Fig. 1;

Fig. 4 showing a single member of the sleeve cutter;

Fig. 5 showing a modified form of construction of the axial cutter;

Fig. 6 showing the same in multi-part construction;

Fig. 7 showing another form of construction of the sleeve and axial cutter;

Fig. 8 showing a section through the cutting basket along the line VIII—VIII of Fig. 7.

Fig. 9 is a vertical longitudinal section of the sleeve with the axial cutter member omitted and having spaced knives arranged spirally therein.

The reference numeral 1 denotes the housing of the apparatus in which the conveyer worm 2 mounted therein is moved in known manner.

The end 3 of the housing 1 serves to receive the improved cutting apparatus designated generally by the reference 4 which after being thrust in the housing 1 is held by a clamping ring 5 and thereby secured in position. The cutting apparatus 4 consists of a sleeve cutter 6 and an axial cutter 7 whose blades 9 and 8 are preferably directed tangentially about their central axis. The knife blades 9 of the sleeve cutter 6 may be formed in split bushes which are thrust into the barrel of the sleeve cutter 6. This arrangement affords the advantage that the manufacture and the working of the sleeve cutter 6 is facilitated, as in practice it is difficult to cast the sleeve cutter 6 with the blades 9 in one piece. The goods to be cut are first cut in known manner by means of a knife 11 and enter through the openings 10 of the sleeve cutter 6. After the goods have entered the sleeve cutter 6 they pass in undulatory manner past the cutting surface 12 and before reaching the outlet are comminuted several times until they have attained the desired degree of fineness. The undulatory movement of the goods is effected by special guide members 13, 14 arranged in the sleeve cutter 6, which members conduct the goods to the blades 8. The goods are deflected by trough-like recesses 15, 16 in the axial cutter 7, which conduct the goods to the blades 9. In order that a firm, clean cut may be obtained, the cutting members are preferably arranged with their cutting edges in a conical surface 12.

The assembled cutting members 6 and 7 are filled automatically by the pressure of the goods.

The sleeve cutter may be formed in one part as indicated at 6a in Fig. 1a, but the grain and the fineness of the goods can be regulated by forming the sleeve cutter 6 of a plurality of parts, namely of three or more individual members 19, 20 and 21, as shown in Fig. 1. In order that the goods may be cut into a coarse grain it suffices to remove the members 20 and 21, as the goods are then cut only at the cutting area 22. In order to obtain a finer grain the sleeve member 20 is thrust on. Then the goods are cut at the cutting areas 22, 23. The finest grain is obtained by the addition of the member 21, since a further comminution of the goods then takes place at the cutting areas 24 and 25. The described process of dissection can, of course, be carried further as desired, without thereby causing the goods to be pressed, as the knife edges, owing to their horizontal position and their open position, seize and cut the goods without the application of pressure thereto.

The fineness of the cut of the goods can also be regulated by putting out of operation the members of the axial cutter instead of those of the sleeve cutter. For this purpose the axial cutter (see Fig. 6) may consist of a plurality of individual parts. If a coarse grain is required it suffices to employ the member 26. It is not necessary to connect the two parts for operation, as owing to their conical shape they are held inside the sleeve cutter.

In the cutting members described above, it was shown that the blades according to Fig. 4 run in axial direction and in the direction the goods are conveyed. The cutting capacity of the blades can, however, be increased by arranging the blades 8 and 9 to run in a spiral, as shown in Figs. 5, 6 and 9. When knife edges of this kind are used, a perfect scissor cut is obtained as they rest only point-wise at the place of cutting after the manner of the blades of a pair of scissors.

The cutting effect can also be enhanced if, for instance, the spiral of the axial cutter is directed oppositely to the spiral of the sleeve cutter, as would be accomplished by employing the axial cutter shown in Fig. 5 or 6 in the sleeve shown in Fig. 9, having spirally arranged knives or blades 9ª, so that the former performs a drawing scissor-cut in a direction opposing the motion of the oncoming goods.

The described device can also be modified according to Figs. 7 and 8. As shown in these figures of the drawings, instead of the extension pieces 20, 21 a simple cutter basket 29 is provided which is held by a clamping ring 30.

In order to obtain different sizes of cut it suffices to change the cutter basket 29 for another which is provided with more or fewer knife edges 31.

The form of construction described above has the advantage that a single unit 19 suffices for all desired sizes of cut, and a plurality of cutter baskets 29 only are required which are each provided with a number of knife edges according to the required fineness of the goods.

I claim:

1. Apparatus for cutting food and like material comprising in combination a sleeve, an inlet and an outlet in said sleeve, an axial member rotatably mounted in said sleeve, a plurality of axially arranged spaced knives fixed on said axial member, a plurality of axially extending spaced knives projecting inwardly from and fixed to said sleeve concentric and co-operating with the knives on said axial member, means for rotating said axial member relative to said sleeve, means for feeding material in an axial direction to the spaces between the knives on the sleeve and a guide member fixedly carried on said sleeve intermediate the length of the knives on said sleeve and subdividing all the spaces between said last-mentioned knives in the axial direction to guide the fed material to the spaces between the knives on the axial member.

2. Apparatus for cutting food and like material comprising in combination a sleeve, an inlet and an outlet in said sleeve, an axial member rotatably mounted in said sleeve, a plurality of spirally arranged spaced knives fixed on said axial member, a plurality of axially extending spaced knives projecting inwardly from and fixed to said sleeve concentric and co-operating with the knives on said axial member, means for rotating said axial member relative to said sleeve, means for feeding material in an axial direction to the spaces between the knives on the sleeve and a guide member fixedly carried on said sleeve intermediate the length of the knives on said sleeve and subdividing all the spaces between said last-mentioned knives in the axial direction to guide the fed material to the spaces between the knives on the axial member.

3. Apparatus for cutting food and like material comprising in combination a sleeve, an inlet and an outlet in said sleeve, an axial member rotatably mounted in said sleeve, a plurality of spirally arranged knives fixed on said axial member, a plurality of spirally arranged spaced knives projecting inwardly from and fixed to said sleeve concentric and co-operating with the knives on said axial member, means for rotating said axial member relative to said sleeve, means for feeding material in an axial direction to the spaces between the knives on the sleeve and a guide member fixedly carried on said sleeve intermediate the length of the knives on said sleeve and subdividing all the spaces between said last-mentioned knives in the axial direction to guide the fed material to the spaces between the knives on the axial member.

4. Apparatus for cutting food and like material comprising in combination a sleeve, an inlet and an outlet in said sleeve, an axial member rotatably mounted in said sleeve, a plurality of axially arranged spaced knives fixed on said axial member, a plurality of axially extending spaced knives projecting inwardly from and fixed to said sleeve co-operating with the knives on said axial member, means for rotating said axial member relative to said sleeve, means for feeding material in an axial direction to the spaces between the knives on the sleeve, at least one guide member on the sleeve, and at least one guide member on the axial member subdividing all the spaces between the knives on the respective members in the axial direction, the guide members on the sleeve and the axial member respectively being offset axially with respect to each other to guide the fed material in an undulating path through the apparatus.

5. Apparatus for cutting food and like material comprising in combination a fixed housing, a rotating worm carried in said housing, an inlet in said housing adjacent one end of said worm, a spindle extending axially from said worm, an axial member fixed to said spindle, a plurality of axially arranged spaced knives fixed on said axial member, a sleeve fixedly carried in said housing concentric with said axial member, a plurality of axially extending spaced knives projecting inwardly and fixed to said sleeve, cooperating with the knives on said axial member, at least one annular guide member on the sleeve subdividing all the spaces between the knives on said sleeve in the axial direction, at least one annular guide member on the axial member subdividing all the spaces between the knives on said axial member in the axial direction, the guide members on the sleeve and the axial member respectively being offset axially with respect to each other, and an outlet communicating with the said spaces.

6. Apparatus for cutting food and like material comprising in combination a fixed housing, a rotating worm carried in said housing, an inlet in said housing adjacent one end of said worm, a spindle extending axially from said worm, an axial member fixed to said spindle, a plurality of spirally arranged spaced knives fixed on said axial member, a sleeve fixedly carried in said housing concentric with said axial member, a plurality of axially extending spaced knives projecting inwardly and fixed to said sleeve and co-operating with the knives on said axial member, at least one annular guide member on the sleeve subdividing all the spaces between the knives on said sleeve in the axial direction, at least one annular guide member on the axial member subdividing all the spaces between the knives on said axial member in the axial direction, the guide members on the sleeve and the axial member respectively being offset axially with respect to each other, and an outlet communicating with the said spaces.

7. Apparatus for cutting food and like material comprising in combination a fixed housing, a rotating worm carried in said housing, an inlet in said housing adjacent one end of said worm, a member extending axially from said worm, a plurality of spirally arranged spaced knives fixed on said axial member, a sleeve fixedly carried by said housing concentric with said member, a plurality of spirally arranged spaced knives projecting inwardly and fixed to said sleeve, and co-operating with the knives on said axial member, at least one annular guide member on the sleeve subdividing all the spaces between the knives on said sleeve in the axial direction, at least one annular guide member on the axial member subdividing all the spaces between the knives on said axial member in the axial direction, the guide members on the sleeve and the axial member respectively being offset axially with respect to each other, and an outlet communicating with the said spaces.

8. Apparatus for cutting food and like material comprising in combination a fixed housing, a rotating worm for feeding the material to be cut carried on said housing, an inlet for said housing adjacent one end of said worm, an axial member fixed to said worm in axial prolongation thereof, a plurality of sleeves detachably carried in said housing and arranged concentric to said axial member, a plurality of axially extending spaced knives projecting inwardly and fixed to each sleeve, a flange at one end of each sleeve extending radially to close the spaces between the knives on the sleeve, the sleeve immediately adjacent the worm being arranged with its flanged end remote from the worm, a plurality of axially arranged spaced knives fixed on said axial member, a plurality of bridge members subdividing the spaces between the knives on said axial member in the axial direction and arranged in staggered axial relation to the flange on each sleeve, an outlet communicating with the said spaces and means for initially guiding the material from the worm to the spaces between the knives on the adjacent sleeve.

9. Apparatus for cutting food and like material comprising in combination a fixed housing, a rotating worm for feeding the material to be cut carried on said housing, an inlet for said housing adjacent one end of said worm, an axial member fixed to said worm in axial prolongation thereof, at least one other axial member coupled coaxially with the first-mentioned member to rotate therewith, a plurality of sleeves detachably carried in said housing and arranged concentric to said axial member, a plurality of axially extending spaced knives projecting inwardly and fixed to said sleeve, a flange at one end of each sleeve extending radially to close the spaces between the knives on the sleeve, the sleeve immediately adjacent the worm being arranged with its flanged end remote from the worm, a plurality of axially arranged spaced knives fixed on said axial members, a plurality of bridge members subdividing the spaces between the knives on said axial member in the axial direction and arranged in staggered relation to the flange on each sleeve, an outlet communicating with the said spaces and means for initially guiding the material from the worm to the spaces between the knives on the adjacent sleeve.

10. Apparatus for cutting food and like material as claimed in claim 9, in which the knives fixed to the sleeve and the knives fixed to the axial member are formed with their cutting edges lying in adjacent conical surfaces of revolution.

11. Apparatus for cutting food and like material as claimed in claim 9, in which the bottom surfaces of the spaces between the knives on the axial member are concave.

12. Apparatus for cutting food and like material as claimed in claim 8, in which the knives fixed to the sleeve and the knives fixed to the axial member are formed with their cutting edges lying in adjacent conical surfaces of revolution.

13. Apparatus for cutting food and like material as claimed in claim 8, in which the bottom surfaces of the spaces between the knives on the axial member are concave.

14. Apparatus for cutting food and like material comprising in combination a fixed housing, a rotating worm for feeding the material to be cut carried on said housing, an inlet for said housing adjacent one end of said worm, an axial member fixed to said worm in axial prolongation thereof, a plurality of sleeves detachably carried in said housing and arranged concentric to said axial member, a plurality of spirally arranged spaced knives projecting inwardly and fixed to each sleeve, a flange at one end of each sleeve extending radially to close the spaces between the knives on the sleeve, the sleeve immediately adjacent the worm being arranged with its flanged end remote from the worm, a plurality of spirally arranged spaced knives fixed on said axial member, a plurality of bridge members sub-dividing the spaces between the knives on said axial member in the axial direction and arranged in staggered axial relation to the flange on each sleeve, an outlet communicating with the said spaces and means for initially guiding the material from the worm to the spaces between the knives on the adjacent sleeve.

15. Apparatus for cutting food and like material comprising in combination a fixed housing, a rotating worm for feeding the material to be cut carried on said housing, an inlet for said housing adjacent one end of said worm, an axial member fixed to said worm in axial prolongation thereof, at least one other axial member coupled coaxially with the first-mentioned member to rotate therewith, a plurality of sleeves detachably carried in said housing and arranged concentric to said axial member, a plurality of spirally arranged spaced knives projecting inwardly and fixed to said sleeve, a flange at one end of each sleeve extending radially to close the spaces between the knives on the sleeve, the sleeve immediately adjacent the worm being arranged with its flanged end remote from the worm, a plurality of spirally arranged spaced knives fixed on said axial members, a plurality of bridge members subdividing the spaces between the knives on said axial member in the axial direction and arranged in staggered relation to the flange on each sleeve, an outlet communicating with the said spaces and means for initially guiding the material from the worm to the spaces between the knives on the adjacent sleeve.

MAXIMILIAN STÖPPEL.